United States Patent [19]

Cornacchia

[11] Patent Number: 4,630,577
[45] Date of Patent: Dec. 23, 1986

[54] STOP-START DEVICE FOR CONTROLLING THE OPERATION OF AN INTERNAL COMBUSTION ENGINE OF A VEHICLE PROVIDED WITH AN AUTOMATIC TRANSMISSION

[75] Inventor: Felice Cornacchia, Turin, Italy

[73] Assignee: Fiat Auto S.p.A., Turin, Italy

[21] Appl. No.: 716,055

[22] Filed: Mar. 26, 1985

[30] Foreign Application Priority Data

Mar. 26, 1986 [IT] Italy .............................. 67289 A/84

[51] Int. Cl.$^4$ ............................................. F02N 11/08
[52] U.S. Cl. ............................ 123/179 B; 123/179 A; 123/198 DB; 123/198 DC; 192/3 R
[58] Field of Search ........ 123/179 A, 179 B, 179 BG, 123/198 DB, 198 DC, 198 D; 192/1, 3 R

[56] References Cited

U.S. PATENT DOCUMENTS

| 3,498,426 | 3/1970 | Nakano | 192/3 R |
|---|---|---|---|
| 3,763,975 | 10/1973 | Fontaine | 192/3 R |
| 3,842,950 | 10/1974 | Fontaine | 192/3 R |
| 4,192,279 | 3/1980 | Maisch et al. | 123/179 A |
| 4,286,683 | 9/1981 | Zeigner et al. | 123/179 B |
| 4,364,343 | 12/1982 | Malik | 123/179 B |
| 4,414,937 | 11/1983 | Ueda et al. | 123/179 A |
| 4,500,794 | 2/1985 | Hamano et al. | 123/179 B |

Primary Examiner—Andrew M. Dolinar
Attorney, Agent, or Firm—Sughrue, Mion, Zinn, Macpeak and Seas

[57] ABSTRACT

The device comprises sensors for providing electrical signals indicative of the speed of the vehicle, the speed of rotation of the engine, the position of the accelerator pedal and the position of the brake pedal. An electronic monitoring and control unit connected to these sensors, activates actuator devices arranged to turn off the engine when, for a period of time of predetermined duration, the speed of rotation of the engine is less than a first predetermined value, the speed of the vehicle is less than a threshold value, and the accelerator pedal is released. This monitoring and control unit deactivates the actuator means and activates the electric starter motor when the signals provided by the sensors indicate that the speed of rotation of the engine is lower than a second predetermined value, less than the first, and the accelelator pedal (or the brake pedal) is depressed.

8 Claims, 1 Drawing Figure

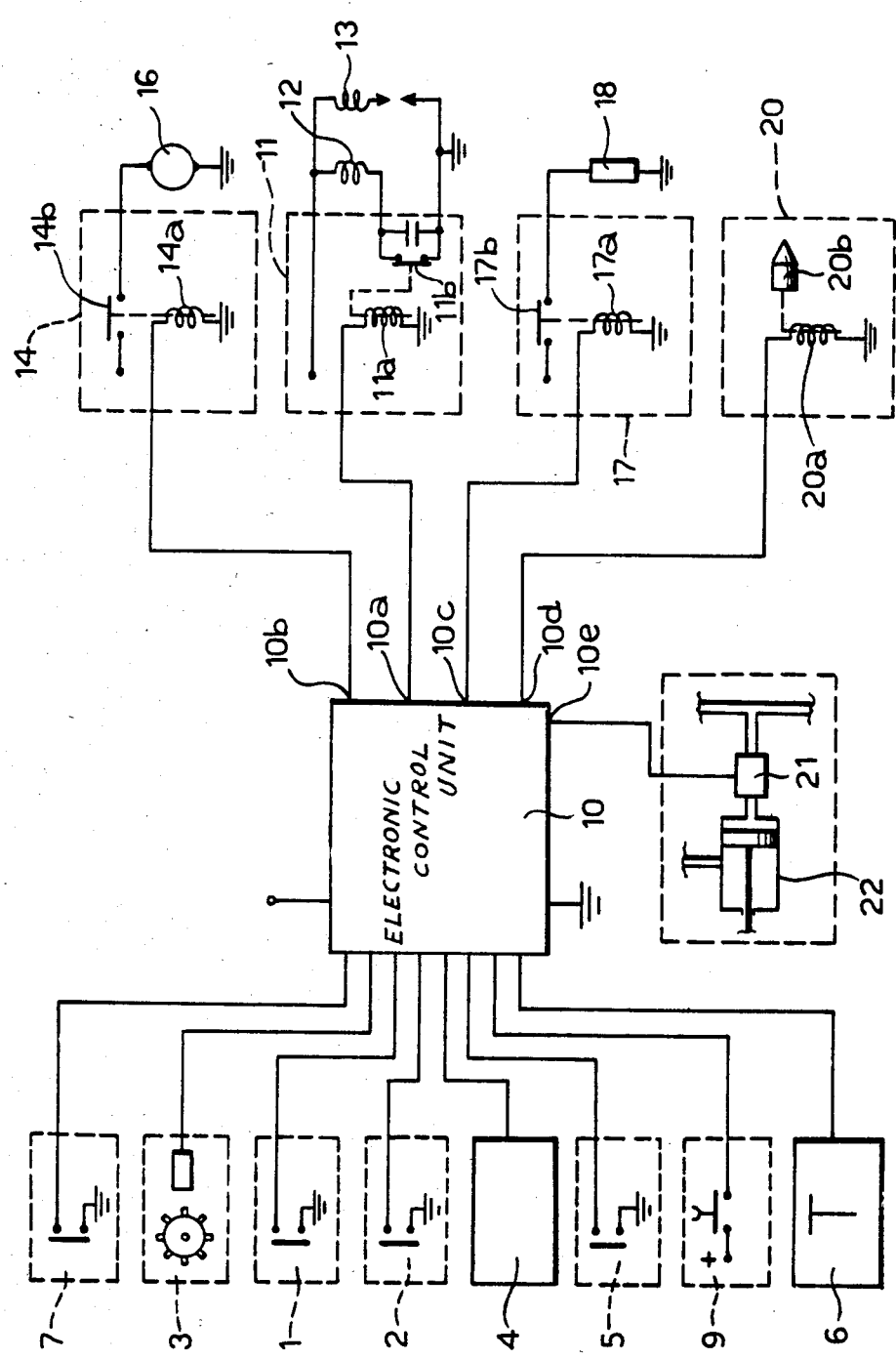

STOP-START DEVICE FOR CONTROLLING THE OPERATION OF AN INTERNAL COMBUSTION ENGINE OF A VEHICLE PROVIDED WITH AN AUTOMATIC TRANSMISSION

The present invention relates to a stop-start device for controlling the operation of the internal combustion engine of a motor vehicle.

The object of the invention is to provide such a device suitable for use in a motor vehicle provided with an automatic transmission. This object is achieved, according to the invention, by a device characterised in that is comprises, in combination:

sensor means operable to provide electrical signals indicative of the speed of the vehicle, the speed of rotation of the engine, and the position of the accelerator pedal, actuator means arranged respectively when activated and de-activated to cause the engine to be turned off and to allow it to be re-started, and an electronic monitoring and control unit connected to the said sensor means, to the said actuator means and to the electric starter motor of the engine; the said unit being arranged to activate the actuator means whenever the signals provided by the said sensor means indicate that, for a period of time of predetermined duration the speed of rotation of the engine is less than a first predetermined value, the speed of the vehicle is less than a predetermined threshold value, and the accelerator pedal is released; and to de-activate the said actuator means and to activate automatically the electric starter motor when the signals provided by the said sensor means indicate that the speed of rotation of the engine is lower than a second predetermined value, less than the said first value, and the accelerator pedal is depressed.

Further characteristics and advantages of the stop-start device according to the invention will become apparent from the following detailed description, made with reference to the attached drawings, provided purely by way of non limiting example, in which there is shown an electric diagram, partially in block form, of an embodiment of the device forming the subject of the invention.

With reference to the drawing, the device according to the invention comprises a position sensor 1 intended to be associated with the accelerator control pedal (not illustrated) of a motor vehicle. This position sensor can be constituted simply by a switch, which closes when the accelerator pedal is depressed.

Reference numeral 2 indicates a further position sensor, intended to be associated with the vehicle brake pedal, and likewise constituted, for example, by a switch.

Reference numeral 3 indicates a speed sensor of known type, for providing an electrical signal indicative of the speed of rotation of the engine crank shaft. Reference numeral 4 indicates a tachometric sensor intended to provide, in operation, an electrical signal indicative of the speed of the vehicle. Reference numeral 5 indicates a further position sensor, for example a switch, associated with the control member of a device for providing an enriched starting mixture.

The apparatus further includes a temperature sensor 6 intended to be associated with the motor vehicle engine in order to detect the temperature thereof. In water cooled engines this sensor can be disposed for example in such a way as to detect the temperature of the cooling water of the engine. Reference numeral 7 indicates a further position sensor (for example a switch) associated with the gear selection lever (not illustrated) and intended to output an electrical enable signal when this lever is in the "drive" position.

The sensor 1 to 7 are connected to corresponding inputs of an electronic monitoring and control unit 10, implemented with the use of microprocessors, for example the Motorola MC 68705 microprocessor.

This unit has a first output 10a connected to the control input of a controlled switch device 11. In the embodiment illustrated in the drawings this switch device is constituted by a relay having an excitation winding 11a which controls a movable contact member 11b interposed in the line connecting the on-board voltage source (battery) of the motor vehicle with the primary winding 12 of the ignition coil. The secondary winding of this coil is indicated 13. The movable contact 11b is normally closed and is arranged to move to its open position upon excitation of the winding 11a, thereby interrupting the ignition circuit of the engine.

The monitoring and control unit 10 has a further output 10b connected to the control input of a controlled switch device 14 also constituted, for example, by a relay with a winding 14a which controls a movable contact 14b. This latter is interposed in the line which connects the electric starter motor 16 of the engine to the battery. The monitoring and control unit 10 has a further output 10c connected to the control input of a further controlled switch device 17. This latter also comprises, for example, a relay with an excitation winding 17a which controls a movable contact 17b interposed between the voltage supply source (battery) and a series of auxiliary electrical devices of the motor vehicle, generally indicated 18. The term "auxiliary" electrical device" is intended to mean all the on-board electrical equipment, the operation of which is not essential to the running of the motor vehicle. Such devices can be constituted, for example, by defrosting or demisting resistors for the rear screen of the motor vehicle, the electric cigarette lighter etc.

A further output 10d of the monitoring and control unit 10 is connected to an electromagnetically controlled shut-off device 20 comprising a control winding 20a and a movable core 20b. This core serves as a shutter and is intended to be disposed in the slow running duct (not illustrated) of the carburettor or mixer of the engine, and can assume a working position and a rest position, in which it respectively shuts off and does not shut off this duct.

Another output 10e of the electronic unit 10 is connected to the control input of a shut-off device 21 disposed downstream of the master cylinder 22 of the brake system of the motor vehicle. This shut-off device can be constituted, for example, by an electrically controlled valve. When it is activated, this device de-couples the braking circuit (the downstream circuit) from the master cylinder 22 in such a way that the pressure in the braking circuit downstream of this device (or even only in the part of the braking circuit relating to one axle) is then maintained substantially equal to the value assumed at the moment at which this device is activated, until subsequent de-activation of the device.

A manually-operable control device 9 is connected to a further input of the monitoring and control unit 10.

This device 9 is constituted for example by a monostable switch (toggle switch), intended to be disposed in a position easily accessible to the driver, and permitting the activation and de-activation of the entire control apparatus described above.

The stop-start device according to the invention operates in the following manner.

When the user activates the system described above, by operation of the control switch 9, the monitoring and control unit 10 is energised. This unit is arranged, using known techniques, to cause activation of the controlled switch device 11 to switch off the motor vehicle engine when the following conditions occur simultaneously:

the speed of the vehicle is less than a predetermined threshold (for example 5 km per hour; this condition is indicated by the sensor 4);
  the engine is turning at a rotational speed less than a predetermined value (for example 1500 rpm; this condition is indicated by the sensor 3);
  the gear selector lever is in the "drive" position (information coming from the sensor 7);
  the accelerator pedal is released (condition indicated by the sensor 1); and
  the above listed conditions occur simultaneously for at least, for example, 0.5–3 seconds.

Alternatively (and preferably) the unit 10 is arranged to cause the engine to be turned off if both the brake and accelerator pedals are released.

The monitoring and control unit 10 can possibly further be arranged to cause the engine to be turned off by means of the controlled switch 11, after the elapse of a predetermined delay starting from the last release of the brake pedal.

When the speed of the vehicle falls below the said threshold value and the speed of rotation of the engine becomes less than the said predetermined value, the control unit 10 is arranged to permit activation of the shut-off device 21: activation takes plasce as soon as the brake pedal is depressed. In this way the tendency of the vehicle, when stopped or almost stationary with the motor running and the transmission in "drive", to advance during the interval of time (for example 0.5–3 seconds as explained above) which falls between the occurrence of the said conditions and the engine being turned off (stop) by the unit 10, is avoided. The activation of the shut-off device 21 causes the maintenance of a residual braking action even after the brake pedal has been released.

The electronic monitoring and control unit 10 causes excitation of the control switch 14, the de-activation of the switch 21, and the restarting of the engine by means of the starter motor 16, when the following conditions occur:

the engine is substantially stopped, or else the speed of rotation is less than a minimum predetermined value, for example 30–60 rpm (a condition detected by means of the sensor 3);
  the selector lever is in "drive" position,
  the brake pedal or the accelerator pedal is pressed.

Upon the occurrence of the said conditions the monitoring and control unit 10 de-energises the relay 11 restoring the electrical continuity of the ignition circuit, and energises the relay 14 causing activation of the starter motor of the internal combustion engine, which therefore starts up again.

The relay 17 is energised when the relay 11 is energised, and de-energised when the relay 14 is energised. In this way, when the stop-start device causes the motor to be turned off, the supply feeding the auxiliary electrical devices of the motor vehicle, some of which may have been previously activated, is interrupted. The relay 17 is conveniently of the delayed de-activation type in order to avoid the motor vehicle battery being overloaded by auxiliary electrical equipment which may have been previously activated.

During running of the motor vehicle, whenever the speed of rotation of the engine exceeds a predetermined value (for example 1500 rpm) the monitoring and control unit 10 is arranged to permit activation of the shut-off device 20. This activation takes place when the position sensor 1 indicates that the accelerator pedal has been released. In this situation the butterfly vlave of the carburettor or mixer of the engine is in the closed position and the shutter 20b completely shuts off the slow running duct. Supply of fuel to the engine therefore ceases.

The monitoring and control unit 10 is further arranged to de-energise the shut off device 20 as soon as the speed of rotation of the engine falls below a predetermined value (for example 1000 rpm) and, with the engine stopped, to allow it a more rapid restarting. In this condition, fuel is resupplied to the engine through the slow running duct of the carburretor: the engine can therefore be readily restarted.

The provision of the shut off device 20 controlled in the manner explained above makes it possible to achieve a significant fuel saving. The sensors 5 and 6 are intended to provide signals inhibiting the operation of the monitoring and control unit 10 respectively when the mixture enrichment device is activated and when the temperature of the motor is less than the minimum predetermined threshold.

Naturally, the activation and de-activation of the actuator devices controlled by the unit 10 can be determined by the occurrence of circumstances other than the conditions listed hereinabove. First, for example, the turning off of the engine when halted can be made conditional upon the level of charge in the motor vehicle battery being greater than a minimum predetermined value sufficient to allow subsequent restarting of the engine.

I claim:

1. A stop-start device for controlling the operation of an internal combustion engine of a motor vehicle provided with a brake pedal, an accelerator pedal, an electric starter motor and, an automatic transmission, comprising:

sensor means operable to provide electrical signals indicative of the speed of the vehicle, the speed of rotation of the engine, and the position of the accelerator pedal,
  actuator means arranged, respectively when activated and deactivated, to cause the engine to be turned off and to allow starting thereof, and
  an electronic monitoring and control unit connected to the said sensor means, to the actuator means and to the electric starter motor of the engine; the said unit being arranged
  to activate the said actuator means whenever the signals provided by the said sensor means indicate that for a period of time of predetermined duration the speed of rotation of the engine is less than a first predetermined value, the speed of the vehicle is less than a predetermined threshold, and the accelerator pedal is released, and to deactivate the said actuator means and automatically activate the electric starter motor when the signals provided by the said sensor means indicate that the speed of rotation of the engine is lower than a second predetermined value, less than the said first value, and the accelerator pedal is depressed, wherein the said sensor means are arranged to provide further electrical signals indicative of the position of the brake pedal, and in that the said electronic monitoring and control unit is arranged to activate the said actuator means whenever the signals provided by the said sensor means indicate that for a period of time of predetermined duration, the speed of rotation of the engine is less than the said first predetermined value, the speed of the vehicle is less than the said threshold value and the brake pedal and the accelerator pedal are both released.

2. A device according to claim 1, wherein the said electronic monitoring and control unit is arranged to de-activate the actuator means and automatically activate the starter motor when the signals provided by the said sensor means indicate that the speed of rotation of the engine is less than the said second predetermined value, and the accelerator pedal or the brake pedal is depressed.

3. A device according to claim 1, wherein the sensor means are arranged to provide further electrical signals indicative of the position of a gear selector lever having a "drive" position, and the said electronic and monitoring control unit is arranged to activate and de-activate the said actuator means only when the signals provided by the sensor means indicate that the selector lever is in the "drive" position.

4. A device according to claim 1, further including an electrically-operated shut-off device, controlled by the electronic monitoring and control unit and intended, when activated, to shutoff a slow running duct of a carburettor or mixer of the engine.

5. A device according to claim 1, further including electrically-operated valve means intended to be inserted in a braking system of the motor vehicle and to maintain, when activated, braking pressure in at least a part of this system substantially equal to the value of the pressure existing at the moment of their activation; the said valve means being controlled by the said monitoring and control unit this latter being arranged to activate the said valve means when the speed of the vehicle is less than the said threshold value, the speed of rotation is less than the said first predetermined value, and the brake pedal is depressed.

6. A device according to claim 5, wherein the said electronic monitoring and control unit is arranged to de-activate the said valve means upon restarting of the engine.

7. A device according to claim 1 wherein the said monitoring and control unit is arranged to allow activation of the said actuator means only after a predetermined period of time starting from the release of the brake pedal.

8. A device according to claim 7 wherein the said monitoring and control unit is arranged to deactivate the said actuator means and activate the electric starter motor only if the brake pedal is depressed for at least a period of time of predetermined duration.

* * * * *